United States Patent
Igarashi et al.

(10) Patent No.: US 8,952,077 B2
(45) Date of Patent: Feb. 10, 2015

(54) SILICONE RUBBER COMPOSITION, SILICONE RUBBER MOLDED ARTICLE, AND PRODUCTION METHOD THEREOF

(71) Applicant: Shin-Etsu Chemical Co., Ltd., Chiyoda-ku (JP)

(72) Inventors: Minoru Igarashi, Annaka (JP); Masayuki Yoshida, Annaka (JP); Yuka Mayumi, Annaka (JP); Tsuneo Kimura, Annaka (JP); Masayuki Ikeno, Annaka (JP)

(73) Assignee: Shin-Etsu Chemical Co., Ltd., Chiyoda-ku (JP)

( * ) Notice: Subject to any disclaimer, the term of this patent is extended or adjusted under 35 U.S.C. 154(b) by 0 days.

(21) Appl. No.: 14/072,244

(22) Filed: Nov. 5, 2013

(65) Prior Publication Data

US 2014/0135416 A1    May 15, 2014

(30) Foreign Application Priority Data

Nov. 13, 2012  (JP) .................. 2012-249409

(51) Int. Cl.
| | | |
|---|---|---|
| B29C 71/04 | (2006.01) | |
| A61L 2/08 | (2006.01) | |
| A61L 24/00 | (2006.01) | |
| C08F 2/46 | (2006.01) | |
| C08G 61/04 | (2006.01) | |
| C08K 3/36 | (2006.01) | |

(52) U.S. Cl.
CPC ........................ *C08K 3/36* (2013.01)
USPC ............... 522/83; 522/71; 522/189; 522/184; 522/1; 520/1

(58) Field of Classification Search
USPC .................. 522/83, 71, 189, 184, 1; 520/1
See application file for complete search history.

(56) References Cited

U.S. PATENT DOCUMENTS

| | | | |
|---|---|---|---|
| 4,364,809 A | 12/1982 | Sato et al. | |
| 4,591,608 A | 5/1986 | Okinoshima | |
| 4,925,562 A | 5/1990 | Te Hennepe et al. | |
| 8,088,878 B2 | 1/2012 | Koellnberger | |
| 8,378,004 B2 * | 2/2013 | Angermaier et al. | 522/99 |
| 8,642,674 B2 * | 2/2014 | Ikeno | 522/148 |
| 2009/0062417 A1 | 3/2009 | Wrobel et al. | |
| 2012/0027970 A1 | 2/2012 | Irmer et al. | |

FOREIGN PATENT DOCUMENTS

| | | |
|---|---|---|
| JP | 55-125123 | 9/1980 |
| JP | 61-21963 | 5/1986 |
| JP | 7-55287 | 6/1995 |
| JP | 3865638 | 10/2006 |
| JP | 2010-537018 | 12/2010 |
| JP | 2011-12264 | 1/2011 |
| JP | 2011-511768 | 4/2011 |

* cited by examiner

*Primary Examiner* — Ling Choi
*Assistant Examiner* — Jessica E Whiteley
(74) *Attorney, Agent, or Firm* — Oblon, Spivak, McClelland, Maier & Neustadt, L.L.P.

(57) ABSTRACT

A UV curable silicone rubber composition is provided. The composition does not undergo curing failure, foaming, and other undesirable conditions even if a water-containing inorganic filler such as zeolite were added. A UV curable silicone rubber composition comprising (A) 100 parts by weight of an organopolysiloxane having at least 2 alkenyl groups per molecule represented by the average compositional formula (I): $R^1_a SiO_{(4-a)/2}$ (I) (wherein $R^1$ is independently a substituted or unsubstituted monovalent hydrocarbon group, and a is a positive number of 1.95 to 2.05); (B) 1 to 300 parts by weight of an inorganic filler having a water content of at least 0.5% by weight; (C) 0.1 to 50 parts by weight of an organohydrogenpolysiloxane having at least 2 silicon-bonded hydrogen atoms per molecule; and (D) a catalytic amount of a photoactive platinum complex curing catalyst.

5 Claims, No Drawings

SILICONE RUBBER COMPOSITION, SILICONE RUBBER MOLDED ARTICLE, AND PRODUCTION METHOD THEREOF

CROSS-REFERENCE TO RELATED APPLICATION

This non-provisional application claims priority under 35 U.S.C. §119(a) on Patent Application No. 2012-249409 filed in Japan on Nov. 13, 2012, the entire contents of which are hereby incorporated by reference.

TECHNICAL FIELD

This invention relates to a silicone rubber composition containing a predetermined amount of an inorganic filler having a high water content such as zeolite which can be cured by UV irradiation. This invention also relates to a method for producing a silicone rubber molded article by using such silicone rubber composition and the silicone rubber molded article.

BACKGROUND ART

Silicone rubbers have excellent properties such as weatherability, electric properties, compression set at low pressure, heat resistance, and cold resistance, and therefore, it is used in various fields such as electric appliance, automobile, architecture, medicine, and foods, and in the applications such as a rubber contact in remote controller, typewriter, word processor, computer terminals, musical instrument, and the like; gasket used in buildings; rolls in copying machines such as development roll, transfer roll, electrification roll, and sheet feeder roll; dumper rubber in audio equipment; and gasket and packing for CD in computers.

Molding of the silicone rubber has been conducted, for example, by a method wherein an organopolysiloxane is thermally cured by using an organic peroxide, or a method wherein an alkenyl group-containing organopolysiloxane and an organohydrogenpolysiloxane are cured by addition reaction using a platinum catalyst.

In the meanwhile, zeolite which has regular pores can adsorb various substances in the pores. Accordingly, zeolite is used in a wide variety of applications such as deodorant and hygroscopic agent as well as water softener and separation membrane in view of selective adsorption property.

For example, JP-B H07-55287 (Patent Document 1) discloses a separation membrane wherein zeolite is dispersed in a silicone rubber matrix, and in this document, the separation membrane is used for the separation of alcohol from water by utilizing the properties of the zeolite. In this document, the film is formed without heating, and the composition used is the so called room temperature vulcanizable (RTV) silicone rubber composition which cures by condensation at room temperature condensation, and no other molding methods are described. Actually, silicone rubbers can be obtained by various molding methods, and silicone rubber tubes may be obtained by extrusion molding which is an efficient method. In the extrusion molding, addition curing wherein the curing is accomplished by hydrosilylation addition reaction under heating is occasionally employed for the curing system, and a curing speed regulation agent such as ethynylcyclohexanol have been used for the regulation of the curing by a platinum catalyst. However, in the case of the silicone rubbers having the zeolite added, extrusion molding accomplished by addition curing wherein heating step is necessary was difficult due to the adsorption of the regulation agent to the zeolite, and difficulty of balancing the surface foaming and the pot life after the addition of the curing agent. Increase in the amount of the regulation agent invites the problem of foaming in the curing while excessively low amount of the regulation agent results in the extremely short pot life despite the prevention of the foaming in the curing. Even if an acyl organic peroxide commonly used in the extrusion molding of the silicone rubber composition were used, the phenomenon of foaming in the molding can not be suppressed in the case of the silicone rubber composition having the zeolite added, and durability is also poor.

In the meanwhile, UV curing method of the silicone rubber composition is described, for example, in JP-A S55-125123 (Patent Document 2) and in JP-B S61-21963 (Patent Document 3). These documents are, however, silent about the formulation of the silicone rubber composition including the fillers such as zeolite containing water at a high content.

Prior art documents related to the present invention include Japanese Patent No. 3865638 (Patent Document 4), JP-A 2011-12264 (Patent Document 5), Japanese Translation of PCT International Application Publication No. JP-T 2010-537018 (Patent Document 6), and Japanese Translation of PCT International Application Publication No. JP-T 2011-511768 (Patent Document 7).

CITATION LIST

Patent Document 1: JP-B H07-55287
Patent Document 2: JP-A S55-125123
Patent Document 3: JP-B S61-21963
Patent Document 4: Japanese Patent No. 3865638
Patent Document 5: JP-A 2011-12264
Patent Document 6: Japanese Translation of PCT International Application Publication No. JP-T 2010-537018
Patent Document 7: Japanese Translation of PCT International Application Publication No. JP-T 2011-511768

SUMMARY OF INVENTION

Technical Problem

The present invention has been completed in view of the situation as described above, and an object of the present invention is to provide a UV curable silicone rubber composition which is curable by UV irradiation and which does not undergo curing failure, foaming, and other undesirable conditions even if an inorganic filler having a high water content such as zeolite were added. Another object of the present invention is to provide a silicone rubber molded article and a method for its production.

Solution to Problem

The inventors of the present invention made an intensive study to realize the objects as described above, and found that when an organopolysiloxane having at least 2 alkenyl groups per molecule, an organohydrogenpolysiloxane having at least 2 SiH groups per molecule, and a photoactive platinum complex curing catalyst are combined to form a UV curable composition, a favorable silicone rubber molded article without failure such as foaming or curing failure can obtained by curing such composition by UV irradiation even if the inorganic filler such as zeolite or reinforcement silica containing some water were used, and the composition were used without removing the water. The present invention has been completed on the basis of such finding.

Accordingly, the present invention provides a UV curable silicone rubber composition as described below. The present invention also provides a method for producing a silicone rubber molded article wherein the silicone composition is cured by UV irradiation, and a silicone rubber molded article.

[1] A UV curable silicone rubber composition comprising
(A) 100 parts by weight of an organopolysiloxane having at least 2 alkenyl groups per molecule represented by the following average compositional formula (I):

$$R^1_a SiO_{(4-a)/2} \qquad (I)$$

wherein $R^1$ is independently a substituted or unsubstituted monovalent hydrocarbon group, and a is a positive number of 1.95 to 2.05,
(B) 1 to 300 parts by weight of an inorganic filler having a water content of at least 0.5% by weight,
(C) 0.1 to 50 parts by weight of an organohydrogenpolysiloxane having at least 2 silicon-bonded hydrogen atoms per molecule, and
(D) a catalytic amount of a photoactive platinum complex curing catalyst.

[2] The silicone rubber composition according to [1] wherein component (B) is zeolite.

[3] The silicone rubber composition according to [1] wherein the photoactive platinum complex curing catalyst of component (D) is selected from β-diketone platinum complex and platinum complex having cyclic diene compound as its ligand.

[4] The silicone rubber composition according to [3] wherein component (D) is a platinum complex selected from the group consisting of
trimethyl(acetyl acetonate) platinum complex,
trimethyl(2,4-pentanedionate) platinum complex,
trimethyl(3,5-heptanedionate) platinum complex,
trimethyl(methylacetoacetate) platinum complex,
bis(2,4-pentanedionate) platinum complex,
bis(2,4-hexanedionate) platinum complex,
bis(2,4-heptanedionate) platinum complex,
bis(3,5-heptanedionate) platinum complex,
bis(1-phenyl-1,3-butanedionate) platinum complex,
bis(1,3-diphenyl-1,3-propanedionate) platinum complex,
(1,5-cyclooctadienyl)dimethyl platinum complex,
(1,5-cyclooctadienyl)diphenyl platinum complex,
(1,5-cyclooctadienyl)dipropyl platinum complex,
(2,5-norboradiene)dimethyl platinum complex,
(2,5-norboradiene)diphenyl platinum complex,
(cyclopentadienyl)dimethyl platinum complex,
(methylcyclopentadienyl)diethyl platinum complex,
(trimethylsilylcyclopentadienyl)diphenyl platinum complex,
(methylcycloocta-1,5-dienyl)diethyl platinum complex,
(cyclopentadienyl)trimethyl platinum complex,
(cyclopentadienyl)ethyldimethyl platinum complex,
(cyclopentadienyl)acetyldimethyl platinum complex,
(methylcyclopentadienyl)trimethyl platinum complex,
(methylcyclopentadienyl)trihexyl platinum complex,
(trimethylsilylcyclopentadienyl)trimethyl platinum complex,
(trimethylsilylcyclopentadienyl)trihexyl platinum complex,
(dimethylphenylsilylcyclopentadienyl)triphenyl platinum complex, and
(cyclopentadienyl)dimethyltrimethylsilylmethyl platinum complex.

[5] The silicone rubber composition according to [4] wherein component (D) is (methylcyclopentadienyl)trimethyl platinum complex.

[6] A method for producing a silicone rubber molded article comprising irradiating the silicone rubber composition of [1] with UV to cure the silicone rubber molded article.

[7] A method for producing a silicone rubber molded article further comprising the step of thermally curing the silicone rubber molded article produced by the production method of [6].

[8] A silicone rubber molded article comprising a cured product of the silicone rubber composition of [1].

Advantageous Effects of Invention

The UV curable silicone rubber composition of the present invention can be effectively cured by UV irradiation without undergoing curing failure or foaming despite its inclusion of an inorganic filler having a water content of 0.5% by weight or higher, and the resulting silicone rubber molded article is a favorable article.

DESCRIPTION OF EMBODIMENTS

Next, the present invention is described in detail.
Component (A)
In the present invention, component (A) is an organopolysiloxane having at least 2 alkenyl groups per molecule represented by the following average compositional formula (I):

$$R^1_a SiO_{(4-a)/2} \qquad (I)$$

wherein $R^1$ is independently a substituted or unsubstituted monovalent hydrocarbon group, and a is a positive number of 1.95 to 2.05.

In the average compositional formula (I), $R^1$ is independently a substituted or unsubstituted monovalent hydrocarbon group, which preferably contains 1 to 12, and more preferably 1 to 8 carbon atoms. Exemplary such groups include alkyl groups such as methyl group, ethyl group, propyl group, butyl group, hexyl group and octyl group, cycloalkyl groups such as cyclopentyl group and cyclohexyl group, alkenyl groups such as vinyl group, allyl group and propenyl group, cycloalkenyl groups, aryl groups such as phenyl group and tolyl group, aralkyl groups such as benzyl group and 2-phenylethyl group, and any of such group having the hydrogen atoms partly or entirely substituted with a halogen atom, cyano group, or the like. The preferred are methyl group, vinyl group, phenyl group, and trifluoropropyl group, and the most preferred are methyl group and vinyl group.

More specifically, the preferred organopolysiloxanes are those wherein the repetition of the diorganosiloxane unit ($R^1_2 SiO_{2/2}$ wherein $R^1$ is as defined above for this formula and the following formulae) constituting the backbone of the organopolysiloxane comprises solely the repetition of dimethylsiloxane unit or the repetition of the dimethylsiloxane unit and another diorganosiloxane unit having phenyl group, vinyl group, 3,3,3-trifluoropropyl group, or the like such as diphenylsiloxane unit, methylphenylsiloxane unit, methylvinylsiloxane unit, or methyl-3,3,3-trifluoropropylsiloxane unit.

It is to be noted that the opposite ends of the molecular chain are preferably endcapped, for example, with a triorganosiloxy group ($R^1_3 SiO_{1/2}$) such as trimethylsiloxy group, dimethylphenylsiloxy group, vinyldimethylsiloxy group, divinylmethylsiloxy group, or trivinylsiloxy group, or with a hydroxydiorganosiloxy group ($R^1_2(HO)SiO_{1/2}$) such as hydroxydimethylsiloxy group. Among these, the preferred is trivinylsiloxy group in view of the high reactivity.

More specifically, the organopolysiloxane of the component (A) should have at least 2 alkenyl groups per molecule, and the organopolysiloxane typically has 2 to 50, and in particular, 2 to 20 alkenyl groups per molecule. The preferred organopolysiloxane is an organopolysiloxane having vinyl group. In this case, 0.01 to 20% by mole, and in particular, 0.02 to 10% by mole of all $R^1$ is preferably an alkenyl group. This alkenyl group may be bonded to the silicon atom at the end of the molecular chain, or to the silicon atom in the midst of the molecular chain (at a location other than the end of the molecular chain), or both, and preferably, the alkenyl group is bonded at least to the silicon atom at the end of the molecular chain.

Letter a is a positive number of 1.95 to 2.05, preferably 1.98 to 2.02, and more preferably 1.99 to 2.01. Of all $R^1$, at least 90% by mole, preferably at least 95% by mole, and more preferably all $R^1$ except for the alkenyl group is an alkyl group, and in particular, methyl group.

Such organopolysiloxane may be obtained, for example, by (co)hydrolytic condensation of one or more organohalogenosilanes, or by ring-opening polymerization of a cyclic polysiloxane (trimer, tetramer, or the like of the siloxane) using an alkaline or acidic catalyst. These are basically a straight chain diorganopolysiloxane, and the component (A) may be a mixture of 2 or more compounds having different molecular weight (degree of polymerization) and molecular structure.

The degree of polymerization of the organopolysiloxane is preferably at least 100 (typically 100 to 100,000), more preferably 2,000 to 50,000, and still more preferably 3,000 to 20,000, and the organopolysiloxane is preferably a non-self-flowable "raw rubber" (non-liquid) at room temperature (25° C.). When the degree of polymerization is too low, the resulting compound may suffer from roll adhesion, and hence, loss or roll workability. In the present invention, the degree of polymerization (or the molecular weight) can be measured as weight average polymerization degree (or weight average molecular weight) in terms of polystyrene typically by gel permeation chromatography (GPC) using toluene as a developer solvent.

Component (B)

Component (B) is an inorganic filler having a water content of at least 0.5% by weight, and exemplary such inorganic fillers include wet silica (precipitated silica), zeolite, aluminum hydroxide, diatomaceous earth, and the like having high water content. The water in such inorganic filler will be the cause of foaming of the molded articles since water is volatilized in the course of curing when the silicone rubber is thermally cured by heating to a temperature of, for example, at least 50° C., and in particular, at least 100° C. by addition curing or by using an acyl organic peroxide in air.

In this case, the water content in an inorganic filler is preferably 0.5 to 5.0% by weight, more preferably 0.5 to 3.0% by weight, and still more preferably 0.5 to 2.0% by weight. The water content is the value measured as a weight loss (% by weight) when the inorganic filler is dried at an elevated temperature in a dryer under the conditions of at 150° C. for 3 hours or at 200° C. for 5 minutes.

In the present invention, the water-containing inorganic filler (B) is, for example, wet silica (precipitated silica) and zeolite.

Examples of the wet silica include NIPSIL (registered trademark)-LP (trade name, manufactured by Tosoh Silica Corporation), TOKUSIL (registered trademark) USA (trade name, manufactured by TOKUYAMA), and Zeosil (registered trademark) 132 (trade name, manufactured by Rhodia Japan).

Zeolite is an aluminosilicate having well developed three dimensional structure, and zeolite is generally shown by the structure: $M_{2/n}O$—$Al_wO_3$-$xSiO_2$-$yH_2O$ (wherein M is an alkaline metal, alkaline earth metal, or the like, n is valence of the metal, x is a number of at least 2, and y is a number of at least 0) based on $Al_2O_3$.

Many types of zeolites are known each having different compositional ratio of silica ($SiO_2$), alumina ($Al_2O_3$), and other metal elements, pore diameter, specific surface area, and the like. The zeolite material used in the present invention may be either a synthetic zeolite or a natural zeolite.

Exemplary zeolites include natural zeolites such as analcime, chabazite, clinoptilolite, erionite, faujasite, mordenite, and phillipsite as well as synthetic zeolites such as zeolite A, zeolite X, and zeolite Y.

In addition, zeolites having a high ratio of the silica component or the alumina component (high silica zeolite or high alumina zeolite) exhibit hydrophobic behavior, and has a nature of adsorbing low polarity component from the mixture of low polarity component and high polarity component. Accordingly, use of a zeolite having a high silica or alumina ratio (high silica zeolite or high alumina zeolite) is preferable for the application such as separation film.

Single inorganic filler or a combination of two or more inorganic fillers may be used for the component (B).

The component (B) may be incorporated at an amount of 1 to 300 parts by weight, preferably at 10 to 250 parts by weight, and more preferably at 20 to 200 parts by weight in relation to 100 parts by weight of the organopolysiloxane of the component (A). Excessively low content of the component (B) may result in the failure of realizing the intended properties (such as deodorization property, hygroscopicity, selective absorption, water softening capability, separation membrane property), while excessively high content may result in the loss of workability and mechanical strength.

Component (C)

Component (C) is an organohydrogenpolysiloxane functioning as the crosslinking agent (curing agent), and this organohydrogenpolysiloxane contains at least 2 silicon-bonded hydrogen atoms (SiH group) per molecule. The organohydrogenpolysiloxane used may be a known conventional organohydrogenpolysiloxane represented by the following average compositional formula (II):

$$R^2_b H_c SiO_{(4-b-c)/2} \quad \text{(II)}$$

In the formula, $R^2$ is a substituted or unsubstituted monovalent hydrocarbon group containing 1 to 8 carbon atoms, and preferably the one not having any aliphatic unsaturated bond such as alkenyl group. Examples of $R^2$ include unsubstituted monovalent hydrocarbon groups such as alkyl groups such as methyl group, ethyl group, propyl group, isopropyl group, butyl group, isobutyl group, tert-butyl group, pentyl group, and hexyl group; cycloalkyl groups such as cyclohexyl group; aryl groups such as phenyl group; aralkyl groups such as benzyl group; and substituted monovalent hydrocarbon groups such as a substituted alkyl group wherein at least a part of the hydrogen atoms in the monovalent hydrocarbons as mentioned above have been substituted with a halogen atom or cyano group such as 3,3,3-trifluoropropyl group or cyanomethyl group. Letters b and c are respectively a positive number; and b is 0.7 to 2.1, c is 0.01 to 1.0, and b+c is 0.8 to 3.0; and preferably, b is 0.8 to 2.0, and c is 0.1 to 1.0, more preferably 0.18 to 1.0, and even more preferably 0.2 to 1.0, and b+c is 1.0 to 2.5.

The molecular structure of the organohydrogenpolysiloxane may be any one of straight chain, cyclic, branched, and three-dimensional network structures. The organohydrogenpolysiloxanes preferred are those wherein the number of the silicon atoms per molecule (or degree of polymerization) is 2 to about 300, and in particular, 4 to about 200, which are liquid at room temperature. The hydrogen atom bonded to the silicon atom (SiH group) may be located at the end of the molecular chain, in the side chain (in the midst of the molecular chain), or at both of such locations, and the organohydrogenpolysiloxanes used are those having at least 2 (typically 2 to 300), preferably at least 3 (for example, 3 to 200), and more preferably at least 4 to about 150 per molecule.

Examples of the organohydrogenpolysiloxane of component (C) include 1,1,3,3-tetramethyldisiloxane,
1,3,5,7-tetramethylcyclotetrasiloxane,
methylhydrogencyclopolysiloxane,
methylhydrogensiloxane-dimethylsiloxane cyclic copolymer,
tris(dimethylhydrogensiloxy)methylsilane,
tris(dimethylhydrogensiloxy)phenylsilane,
methylhydrogenpolysiloxane endcapped at opposite ends with trimethylsiloxy group,
dimethylsiloxane-methylhydrogensiloxane copolymer endcapped at opposite ends with trimethylsiloxy group,
dimethylpolysiloxane endcapped at opposite ends with dimethylhydrogensiloxy group,
dimethylsiloxane-methylhydrogensiloxane copolymer endcapped at opposite ends with dimethylhydrogensiloxy group,
methylhydrogensiloxane-diphenylsiloxane copolymer endcapped at opposite ends with trimethylsiloxy group,
methylhydrogensiloxane-diphenylsiloxane-dimethylsiloxane copolymer endcapped at opposite ends with trimethylsiloxy group,
cyclicmethylhydrogenpolysiloxane,
cyclicmethylhydrogensiloxane-dimethylsiloxane copolymer,
cyclicmethylhydrogensiloxane-diphenylsiloxane-dimethylsiloxane copolymer,
a copolymer comprising $(CH_3)_2HSiO_{1/2}$ unit and $SiO_{4/2}$ unit,
a copolymer comprising $(CH_3)_2HSiO_{1/2}$ unit, $SiO_{4/2}$ unit, and $(C_6H_5)SiO_{3/2}$ unit,
any of the compound as mentioned above wherein the methyl group is partly or entirely substituted with other alkyl group such as ethyl group or propyl group or an aryl group such as phenyl group. Examples of such organohydrogenpolysiloxane include the compounds having the following structural formulae:

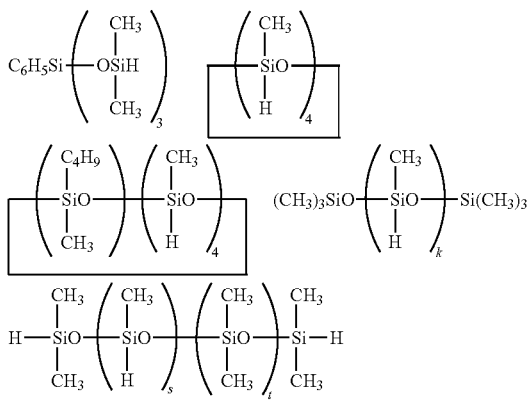

wherein k is an integer of 2 to 10, and s and t are respectively an integer of 0 to 10.

Preferably, the organohydrogenpolysiloxane used is the one which is liquid with the viscosity at 25° C. of 0.5 to about 10,000 mPa·s, and in particular 1 to about 300 mPa·s. The viscosity is the value measured typically by a rotary viscometer (for example, BL, BH, BS, or corn plate type viscometer).

The organohydrogenpolysiloxane of the component (C) may be incorporated at an amount of 0.1 to 50 parts by weight, preferably at 0.1 to 30 parts by weight, more preferably at 0.1 to 10 parts by weight, and still more preferably at 0.3 to 10 parts by weight in relation to 100 parts by weight of the organopolysiloxane of the component (A).

The organohydrogenpolysiloxane of the component (C) is also preferably incorporated so that molar ratio of the hydrogen atom bonded to the silicon atom (namely, SiH group) in the organohydrogenpolysiloxane of the component (C) to the alkenyl group bonded to the silicon atom in the component (A) is 0.5 to 10 mol/mol, preferably 0.8 to 6 mol/mol, and more preferably 1 to 5 mol/mol. When the molar ratio is less than 0.5 mol/mol, crosslinking will be insufficient, and sufficient mechanical strength may not be obtained, while the molar ratio in excess of 10 mol/mol may invite loss of physical properties after the curing, and in particular, marked deterioration in the heat resistance and compression set.

Component (D)

Component (D) is a photoactive platinum complex curing catalyst, and it has the catalytic action of the addition reaction between the component (A) and the component (C) (namely, hydrosilylation addition reaction between the alkenyl group and the SiH group) upon activation by the irradiation of a light (in particular, a light having a wavelength of UV or shorter). In the present invention, the compound which can serve the photoactive platinum complex curing catalyst of the component (D) is typically a β-diketone platinum complex or a platinum complex having a cyclic diene compound as a ligand.

Exemplary β-diketone platinum complex include
trimethyl(acetyl acetonate) platinum complex,
trimethyl(2,4-pentanedionate) platinum complex,
trimethyl(3,5-heptanedionate) platinum complex,
trimethyl(methylacetoacetate) platinum complex,
bis(2,4-pentanedionate) platinum complex,
bis(2,4-hexanedionate) platinum complex,
bis(2,4-heptanedionate) platinum complex,
bis(3,5-heptanedionate) platinum complex,
bis(1-phenyl-1,3-butanedionate) platinum complex, and
bis(1,3-diphenyl-1,3-propanedionate) platinum complex.
Exemplary platinum catalysts having cyclic diene compound as their ligand include
(1,5-cyclooctadienyl)dimethyl platinum complex,
(1,5-cyclooctadienyl)diphenyl platinum complex,
(1,5-cyclooctadienyl)dipropyl platinum complex,
(2,5-norboradiene)dimethyl platinum complex,
(2,5-norboradiene)diphenyl platinum complex,
(cyclopentadienyl)dimethyl platinum complex,
(methylcyclopentadienyl)diethyl platinum complex,
(trimethylsilylcyclopentadienyl)diphenyl platinum complex,
(methylcycloocta-1,5-dienyl)diethyl platinum complex,
(cyclopentadienyl)trimethyl platinum complex,
(cyclopentadienyl)ethyldimethyl platinum complex,
(cyclopentadienyl)acetyldimethyl platinum complex,
(methylcyclopentadienyl)trimethyl platinum complex,
(methylcyclopentadienyl)trihexyl platinum complex,
(trimethylsilylcyclopentadienyl)trimethyl platinum complex,
(trimethylsilylcyclopentadienyl)trihexyl platinum complex,
(dimethylphenylsilylcyclopentadienyl)triphenyl platinum complex, and (cyclopentadienyl)dimethyltrimethylsilylmethyl platinum complex.

Among these, the preferred are platinum catalysts having cyclic diene compound as their ligand, and in particular, (methylcyclopentadienyl)trimethyl platinum complex, (methylcyclopentadienyl)trihexyl platinum complex, (trimethylsilylcyclopentadienyl)trimethyl platinum complex, (trimethylsilylcyclopentadienyl)trihexyl platinum complex, (dimethylphenylsilylcyclopentadienyl)triphenyl platinum complex, and (cyclopentadienyl)dimethyltrimethylsilylmethyl platinum complex.

Content of the component (D) is not particularly limited as long as it is a catalytically effective amount. However, the component (D) is preferably used so that the amount of the component (D) in terms of the weight of the platinum metal in relation to the total weight of the component (A) and (C) is 1 to about 5,000 ppm, and more preferably 10 to about 500 ppm. The amount of less than 1 ppm may invite marked delay of the addition reaction or failure of the curing while the amount in excess of 5,000 ppm is economically unfavorable.

Curing mechanism in the organopolysiloxane composition of the present invention is the UV irradiation of the three component system obtained by mixing the alkenyl group-containing organopolysiloxane of the component (A), the organohydrogenpolysiloxane of the component (C), and the photoactive platinum complex curing catalyst of the component (D).

The silicone rubber composition of the present invention can be obtained by kneading predetermined amount of the components as described above by using dual rolls, a kneader, Ban bury mixer, and the like.

The silicone rubber composition of the present invention may contain additives other than the components as described above to the extent not adversely affecting the objects of the present invention. Exemplary such additives include electro-conductivity imparting agents such as carbon black, flame retardants such as iron oxide and halogen compounds, softeners, antiaging agents, UV absorbents, and colorants.

The silicone rubber composition of the present invention can be readily cured by UV irradiation. Exemplary UV irradiation sources include low pressure mercury lamp, high pressure mercury lamp, ultrahigh pressure mercury lamp, xenon lamp, xenon-mercury lamp, and metal halide lamp. The preferred is high pressure mercury lamp in view of availability, and the high pressure mercury lamp may be either ozone-generating mercury lamp or ozone-free mercury lamp. In view of the association of the high energy wavelength UV radiation, the preferred is the ozone-generating mercury lamp.

While the UV curing conditions are not particularly limited, the UV irradiation is preferably conducted at a UV intensity (UV irradiation dose) of at least 50 mJ/cm$^2$, and more preferably at least 100 mJ/cm$^2$. UV intensity of less than 50 mJ/cm$^2$ may result in the insufficient curing as well as foaming in the heat treatment subsequent to the UV irradiation. The UV irradiation temperature is not particularly limited, and the UV irradiation at a temperature around the room temperature is acceptable. Typical temperature is in the range of 0 to 70° C., and the more preferred is curing at 10 to 40° C. The irradiation time is not particularly limited as long as the UV irradiation of the irradiation dose as described above is conducted. It is to be noted that the UV intensity (UV irradiation dose) is typically about 30,000 mJ/cm$^2$ or less, and in particular, about 10,000 mJ/cm$^2$ or less while no upper limit is set for the UV intensity (UV irradiation dose).

The curing in the interior of the material can be promoted by curing in a heated air after the UV irradiation. Even if the curing in the interior were insufficient, the surface is cured by UV irradiation, and a molded article fully cured to its interior can be obtained without foaming by the UV irradiation and the following heat treatment.

In this case, the heating is preferably conducted at 100 to 400° C., and in particular, at 120 to 200° C. for 5 seconds to 2 hours, and in particular, for 1 to 20 minutes.

In the curing of the extruded conventional silicone rubber material, the material had to be cured by addition curing or by using an acyl organic peroxide and thereafter heating in air, and when a water-containing filler is added, the article suffered from the problems of, for example, foaming. In contrast, the method of the present invention has enabled to mold the silicone rubber without causing the problem of foaming even if the water-containing filler were incorporated.

EXAMPLES

Next, the present invention is described in detail by referring to Examples and Comparative Examples which by no mean limit the scope of the invention. In the Examples and Comparative Examples, "part" means "part by weight", and "average degree of polymerization" is the weight average degree of polymerization in terms of polystyrene measured by gel permeation chromatography (GPC) using toluene for the solvent.

Example 1

40 parts of a straight chain organopolysiloxane (I) (raw rubber) having an average degree of polymerization of about 6,000 containing 99.850% by mole of dimethylsiloxane unit, 0.125% by mole of methylvinylsiloxane unit as the diorganosiloxane unit constituting the backbone, and 0.025% by mole of dimethylvinylsiloxy group as the molecular chain end group; and 60 parts of high silica zeolite HiSiv 3000 having a water content of 1.8% by weight (weight loss by heat treatment at 200° C. for 5 minutes) (hydrophobic molecular sieve manufactured by Union Showa K.K.) were homogeneously kneaded in a kneader at room temperature (25° C.) to prepare a compound.

1.4 parts of methylhydrogenpolysiloxane having SiH group in the side chain (dimethylsiloxane-methylhydrogensiloxane copolymer having opposite ends of the molecular chain endcapped with trimethylsiloxy group having a degree of polymerization of about 80 and a SiH group content of 0.0055 mol/g) as the crosslinking agent and 0.3 part of 0.16% by weight toluene solution of (methylcyclopentadienyl)trimethyl platinum complex as the photoactive platinum catalyst were added to 100 parts of the compound as described above. The mixture was homogeneously kneaded to prepare a silicone rubber composition. An uncured sheet having a thickness of 2 mm was prepared from this silicone rubber composition, and this sheet was exposed to a UV beam of 5,000 mJ/cm$^2$ to prepare a test sheet.

Example 2

The test sheet was prepared by repeating the procedure of Example 1 except that the UV intensity was 1,000 mJ/cm$^2$.

Example 3

The test sheet was prepared by repeating the procedure of Example 1 except that the alkenyl group-containing organopolysiloxane used was a straight chain organopolysiloxane (I) (raw rubber) having an average degree of polymerization of about 6,000 containing 99.850% by mole of dimethylsiloxane unit, 0.125% by mole of methylvinylsiloxane unit as the diorganosiloxane unit constituting the backbone, and 0.025% by mole of dimethylvinylsiloxy group as the molecular chain end group.

Example 4

The test sheet was prepared by repeating the procedure of Example 1 except that 0.6 part of the 0.16% by weight toluene solution of (methylcyclopentadienyl)trimethyl platinum complex was added.

Example 5

The sheet prepared in Example 1 was further subjected to post-cure treatment at 200° C. for 2 hours. The test sheet was thereby prepared.

Comparative Example 1

The test sheet was prepared by repeating the procedure of Example 1 except that the UV irradiation was omitted, and the sheet was placed in a dryer at 250° C. dryer (in air) for 15 minutes.

Comparative Example 2

An uncured silicone rubber sheet was prepared by repeating the procedure of Example 1 except that the organohydrogenpolysiloxane and the (methylcyclopentadienyl)-trimethyl platinum complex replaced with 0.5 part/2.0 parts of C-25A (platinum catalyst with no photoactivity)/C-25B (organohydrogenpolysiloxane) (both manufactured by Shin-Etsu Chemical Co., Ltd.) as the addition crosslinkable curing agent. The uncured silicone rubber sheet was irradiated with the UV light at an intensity of 5,000 mJ/cm$^2$ as in the case of Example 1 to prepare a test sheet.

Comparative Example 3

An uncured silicone rubber sheet was prepared by repeating the procedure of Example 1 except that the organohydrogenpolysiloxane and the (methylcyclopentadienyl)-trimethyl platinum complex replaced with 0.5 part/2.0 parts of C-25A (platinum catalyst with no photoactivity)/C-25B (organohydrogenpolysiloxane) (both manufactured by Shin-Etsu Chemical Co., Ltd.) as the addition crosslinkable curing agent, the UV irradiation was omitted, and the sheet was placed in a dryer at 250° C. dryer (in air) for 15 minutes.

Comparative Example 4

An uncured silicone rubber sheet was prepared by repeating the procedure of Example 1 except that the organohydrogenpolysiloxane and the (methylcyclopentadienyl)-trimethyl platinum complex were not added, 1.0 part of bis(4-methylbenzoyl)peroxide was added as the organic peroxide, the UV irradiation was omitted, and the sheet was placed in a dryer at 250° C. dryer (in air) for 15 minutes.

(Evaluation)

The thus obtained test sheets were observed for their appearance to thereby evaluate the foaming from the appearance, and measured for hardness (Durometer A) according to JIS K6249. The results are shown in Tables 1 and 2.

TABLE 1

| | | | Example | | | | |
|---|---|---|---|---|---|---|---|
| | | | 1 | 2 | 3 | 4 | 5 |
| Content (part) | (A) | Organopolysiloxane (I) | 40 | 40 | | 40 | 40 |
| | | Organopolysiloxane (II) | | | 40 | | |
| | (B) | Zeolite | 60 | 60 | 60 | 60 | 60 |
| | (C) | Organohydrogenpolysiloxane | 1.4 | 1.4 | 1.4 | 1.4 | 1.4 |
| | (D) | Photoactive platinum complex curing catalyst* | 0.3 | 0.3 | 0.3 | 0.6 | 0.3 |
| Curing conditions | | UV irradiation intensity (mJ/cm$^2$) | 5,000 | 1,000 | 5,000 | 5,000 | 5,000 |
| | | Heat molding conditions (in air) | — | — | — | — | 200° C., 2 hr (postcuring) |
| Evaluation | | Hardness (durometer A) | 50 | 36 | 55 | 73 | 75 |
| | | Appearance | No foaming | No foaming | No foaming | No foaming | No foaming |

*Added as a 0.16% by weight toluene solution.

TABLE 2

| | | | Comparative Example | | | |
|---|---|---|---|---|---|---|
| | | | 1 | 2 | 3 | 4 |
| Content (part) | (A) | Organopolysiloxane (I) | 60 | 60 | 60 | 60 |
| | (B) | Zeolite | 40 | 40 | 40 | 40 |
| | (C) | Organohydrogenpolysiloxane | 1.4 | | | |
| | (D) | Photoactive platinum complex curing catalyst *1 | 0.3 | | | |
| | | Addition Curing agent *2 | | 0.5/2.0 | 0.5/2.0 | |
| | | Organic peroxide | | | | 1.0 |

TABLE 2-continued

|  |  | Comparative Example | | | |
|---|---|---|---|---|---|
|  |  | 1 | 2 | 3 | 4 |
| Curing conditions | UV irradiation intensity (mJ/cm²) | — | 5,000 | — | — |
|  | Heat molding conditions (in air) | 250° C., 15 min | — | 250° C., 15 min | 250° C., 15 min |
| Evaluation | Hardness (durometer A) | — | — | — | — |
|  | Appearance | Foaming | No curing | Foaming | Foaming |

*1 Added as a 0.16% by weight toluene solution.
*2 (Platinum catalyst)/(organohydrogenpolysiloxane)

In the foregoing, the present invention has been described by referring to various embodiments which by no means limit the scope of the present invention. Other embodiments, additions, modifications, deletions may be included as long as they are apparent to those skilled in the art, and all of such embodiments are within the scope of the present invention as long as the action or merits of the present invention are realized.

Japanese Patent Application No. 2012-249409 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for producing a silicone rubber molded article, comprising irradiating a UV curable silicone rubber composition with UV to cure into the silicone rubber molded article and then thermally curing the silicone rubber molded article wherein the UV curable silicone rubber composition comprises:
    (A) 100 parts by weight of an organopolysiloxane having at least 2 alkenyl groups per molecule represented by the following average compositional formula (I):

$$R^1_a SiO_{(4-a)/2} \qquad (I)$$

wherein $R^1$ is independently a substituted or unsubstituted monovalent hydrocarbon group, and a is a positive number of 1.95 to 2.05,
    (B) 1 to 300 parts by weight of an inorganic filler having a water content of at least 0.5% by weight,
    (C) 0.1 to 50 parts by weight of an organohydrogenpolysiloxane having at least 2 silicon-bonded hydrogen atoms per molecule, and
    (D) a catalytic amount of a photoactive platinum complex curing catalyst.

2. The method according to claim 1, wherein component (B) is zeolite.

3. The method according to claim 1, wherein the photoactive platinum complex curing catalyst of component (D) is selected from a β-diketone platinum complex and a platinum complex having cyclic diene compound as its ligand.

4. The method according to claim 1, wherein component (D) is a platinum complex selected from the group consisting of
    trimethyl(acetyl acetonate) platinum complex,
    trimethyl(2,4-pentanedionate) platinum complex,
    trimethyl(3,5-heptanedionate) platinum complex,
    trimethyl(methylacetoacetate) platinum complex,
    bis(2,4-pentanedionate) platinum complex,
    bis(2,4-hexanedionate) platinum complex,
    bis(2,4-heptanedionate) platinum complex,
    bis(3,5-heptanedionate) platinum complex,
    bis(1-phenyl-1,3-butanedionate) platinum complex,
    bis(1,3-diphenyl-1,3-propanedionate) platinum complex,
    (1,5-cyclooctadienyl)dimethyl platinum complex,
    (1,5-cyclooctadienyl)diphenyl platinum complex,
    (1,5-cyclooctadienyl)dipropyl platinum complex,
    (2,5-norboradiene)dimethyl platinum complex,
    (2,5-norboradiene)diphenyl platinum complex,
    (cyclopentadienyl)dimethyl platinum complex,
    (methylcyclopentadienyl)diethyl platinum complex,
    (trimethylsilylcyclopentadienyl)diphenyl platinum complex,
    (methylcycloocta-1,5-dienyl)diethyl platinum complex,
    (cyclopentadienyl)trimethyl platinum complex,
    (cyclopentadienyl)ethyldimethyl platinum complex,
    (cyclopentadienyl)acetyldimethyl platinum complex,
    (methylcyclopentadienyl)trimethyl platinum complex,
    (methylcyclopentadienyl)trihexyl platinum complex,
    (trimethylsilylcyclopentadienyl)trimethyl platinum complex,
    (trimethylsilylcyclopentadienyl)trihexyl platinum complex,
    (dimethylphenylsilylcyclopentadienyl)triphenyl platinum complex, and
    (cyclopentadienyl)dimethyltrimethylsilylmethyl platinum complex.

5. The method according to claim 1, wherein component (D) is (methylcyclopentadienyl)trimethyl platinum complex.

* * * * *